Sept. 4, 1928.

G. A. DE VLIEG 1,682,835

TOOL SPINDLE FIXTURE

Filed Oct. 14, 1925

Inventor:-
Gerard A. DeVlieg
By Churchill Parker Paulson
Attys.

Sept. 4, 1928.  G. A. DE VLIEG  1,682,835
TOOL SPINDLE FIXTURE
Filed Oct. 14, 1925  2 Sheets-Sheet 2
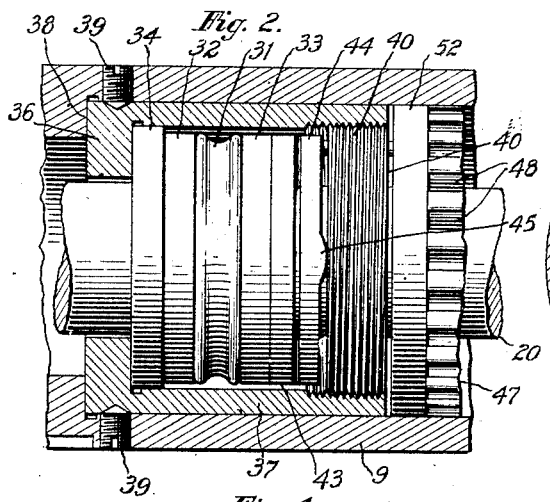
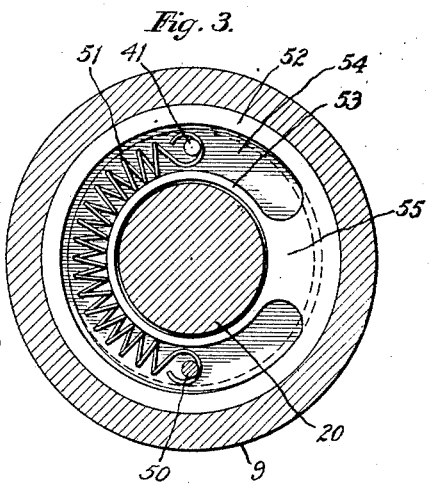
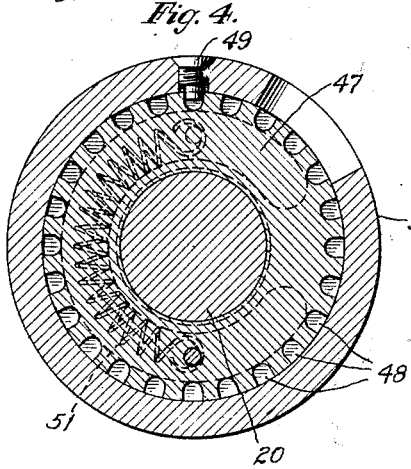
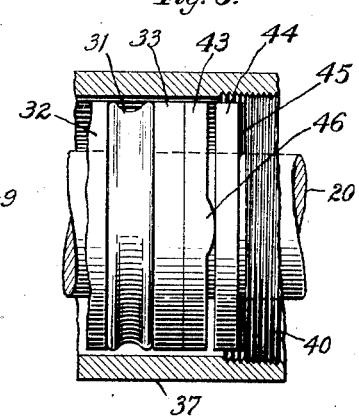
Inventor:-
Gerard A. DeVlieg
By Churchill, Parker, Koulian
Attys Patented Sept. 4, 1928.

1,682,835

UNITED STATES PATENT OFFICE.

GERARD A. DE VLIEG, OF ROCKFORD, ILLINOIS.

TOOL-SPINDLE FIXTURE.

Application filed October 14, 1925. Serial No. 62,339.

My invention relates to improvements in spindle fixtures for machine tools, such as grinding machines, lathes and end milling machines.

In machine tools where the end thrust on the spindle is perpendicular to the plane of the cutting face, end play is objectionable since it produces a wavy or irregular surface on the work, and hence lowers the accuracy and efficiency of operation. The primary object of my invention is to provide novel means for preventing objectionable end play of the spindle.

Another object is to provide means of the above character which is self-actuating and self-alining, and which will compensate for wear.

A further object is to provide means of the above character which may be adapted to a large variety of machine tools, and which may be applied to existing machine tools without requiring extensive alterations.

Another object is to provide means for eliminating end play in spindles which is simple and inexpensive in construction, and which is efficient and certain in operation.

Further objects and advantages will become apparent as the description proceeds.

In the accompanying drawings, Figure 1 is a longitudinal sectional view of a spindle embodying the features of my invention.

Fig. 2 is a fragmentary view of the construction shown in Figure 1 but showing the parts on the spindle in elevation.

Fig. 3 is a sectional view taken along line 3—3 of Figure 1.

Fig. 4 is a sectional view taken along line 4—4 of Figure 1.

Fig. 5 is a fragmentary view similar to Fig. 2 but taken at right angles thereto.

Figure 1:
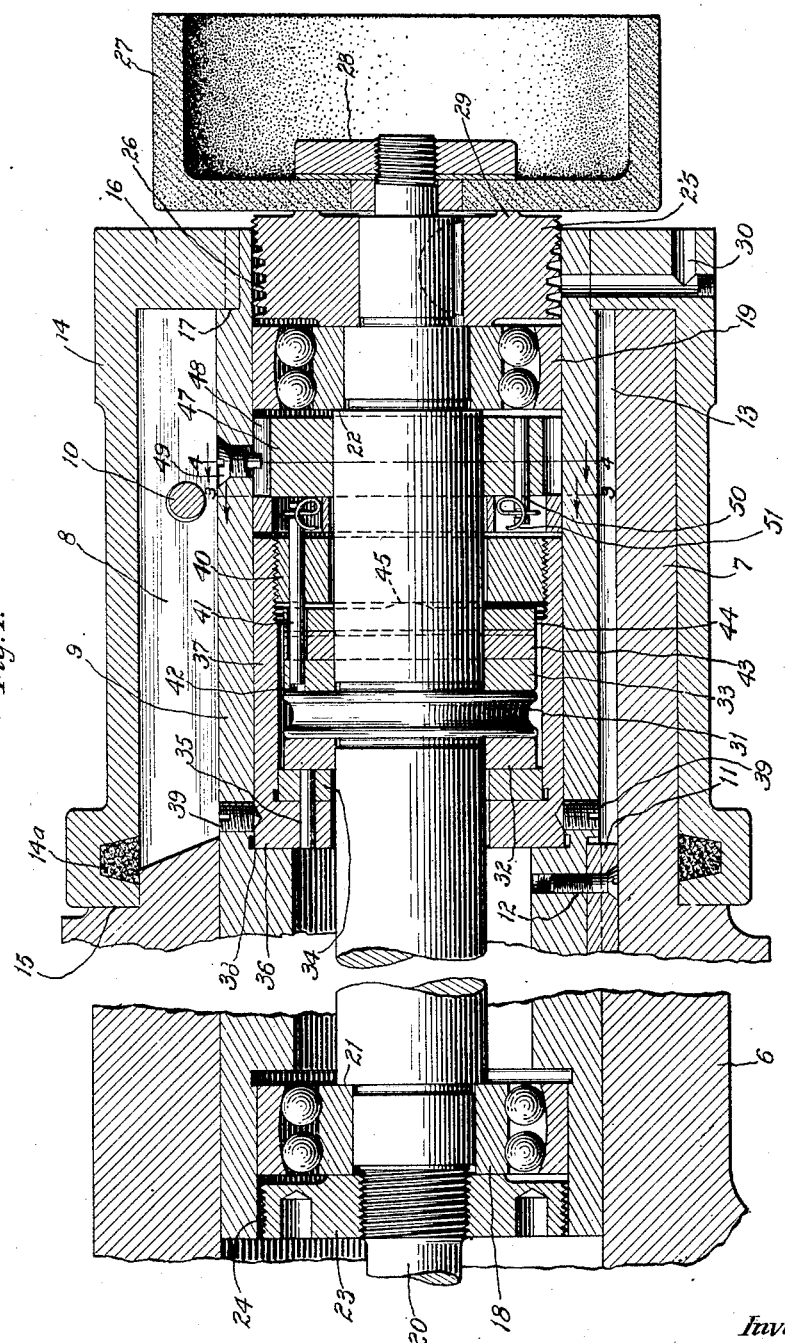

While the invention is susceptible of various modifications and alternative constructions, I have shown in the drawings and will herein describe in detail the preferred embodiment thereof, but it is to be understood that I do not thereby intend to limit the invention to the specific form disclosed but aim in the appended claims to cover all modifications and alternative constructions falling within the spirit and scope of the invention.

Referring to the drawings, 6 designates a fragment of a frame casting of a machine tool, which is shown in the present instance as a surface grinder adapted to grind reamers and other tools. The casting is formed with a laterally projecting sleeve 7 which is split longitudinally at 8. A second sleeve 9 is positioned in the sleeve 7, and is secured in place by means of a clamping screw 10 extending through the split section of the last mentioned sleeve. A key 11 is secured to the sleeve 9 by a screw 12, and engages a longitudinal keyway 13 formed in the inner surface of the sleeve 7 to hold the sleeves against relative rotation. Fitting over the sleeve 7 is a cylindrical housing 14, one end of which fits closely to a shoulder 15 on the casting 6, and the other end of which is provided with a radial flange 16 fitting over the end of the sleeve 7 and the reduced outer end of the sleeve 9 against a peripheral shoulder 17 on the latter. A suitable sealing band 14ª is provided in a groove in the inner surface of the housing 14 next to the shoulder 15. The housing thus encloses or seals the split section of the sleeve 7, and thereby prevents emery and other foreign matter from entering the working parts of the apparatus.

Mounted in opposite ends of the sleeve 9 are two anti-friction bearings 18 and 19 in which the opposite ends of a shaft or spindle 20 are journalled. The spindle is formed with shoulders 21 and 22 against which the bearings 18 and 19 respectively, are positioned. The bearing 18 is held in position by a ring nut 23 threaded into the inner end of the spindle 20 and formed on its periphery with threads 24. These threads are provided with a high lead and a direction opposite to that in which the spindle is rotated so that foreign matter seeking to pass to the bearing 18 is exhausted. A ring 25 is keyed to the front end of the spindle 20, and serves to hold the bearing 19 in position. The ring 25 is provided with suitable threads 26, generally similar to the threads 24, for excluding foreign matter. A grinding wheel 27 of any suitable type is mounted on the front end of the spindle 20, and is clamped by a nut 28 against an alining flange 29 formed on the outer face of the ring 25. Oil from the bearing 19 is drained through a passage 30 formed in the sleeve 9 and the housing 14. The construction thus far described is old and well known.

Means is provided to hold the spindle 20 against objectionable end play. This means comprises a peripheral flange 31 on the spindle 20 between the bearings 18 and 19. The flange 31 preferably is integral with the spindle and is made to possess good wearing qualities. Rotatably mounted on the spindle 20 and adapted to frictionally engage the front and rear sides of the flange 31 are two friction or bearing rings 32 and 33 respectively. These rings preferably are made of a material substantially softer than that of the flange. The ring 32 fits against a spacing ring 34 constituted of relatively hard material and secured by means of a pin 35 to a radial end flange 36 on a sleeve or housing 37. The latter is positioned snugly in the sleeve 9, and the flange 36 fits against a shoulder 38 formed in the inner periphery of the sleeve. Set screws 39 (Fig. 2) serve to hold the sleeve 37 in position in the sleeve 9.

An annular nut 40 is threaded into the front end of the sleeve 37, and carries a pin 41 which extends parallel to the spindle 20 and into a hole 42 in the ring 33. The direction of the lead of the threads of the nut 40 is such that if the nut is rotated with the spindle 20 it will move outwardly in the sleeve 37. In the present instance, the spindle 20 is intended to rotate in a clockwise direction, and the nut 40 is therefore provided with left hand threads. Loosely interposed between the ring 33 and the nut 40 are two alining rings 43 and 44 which fit loosely over the pin 41. The ring 44 is formed with diametrically opposed bosses 45 which engage the inner face of the nut 40 and are disposed in a horizontal plane. The ring 43 likewise is provided with a pair of diametrically opposed bosses 46 which engage the inner face of the ring 44 and are vertically disposed. These bosses permit the rings 43 and 44 to rock about mutually perpendicular axes, thereby providing a universal alining action for properly seating the friction ring 33 against the flange 31.

Mounted on the spindle 20 between the bearing 19 and the nut 40 is an annular adjusting ring 47 which preferably is formed on its periphery with a plurality of serrations or notches 48. A set screw 49 in the sleeve 9 selectively engages the notches to hold the ring 47 in different adjusted positions. The ring 47 carries a pin 50 which extends laterally thereof and which is positioned substantially diametrically opposite to the pin 41. A spring 51 is fastened at its ends to the free ends of the pins 41 and 50, and extends around the front side of the spindle 20 to oppose rotation of the nut 40 in a clockwise direction. To space the spring peripherally from the spindle so as to prevent wear, it is positioned in a housing interposed between the nut 40 and the ring 47 (see Fig. 3). The housing comprises two concentric spaced bands 52 and 53 defining an annular space 54 and connected at one side by a web 55. By rotatably adjusting the ring 47 in the sleeve 9 the tension of the spring 51 can be adjusted.

In assembling the spindle, the nut 40 is turned inwardly until the alining rings 43 and 44 press the friction ring 33 against the flange 31. Since the position of the friction ring 32 is fixed, the flange 31 is clamped between the two rings 32 and 33. The tension of the spring 51 is now adjusted by turning the adjusting ring 47 to maintain this condition. Preferably the spring tension is made slightly greater than that required to maintain this condition so that the nut 40 will be forced inwardly to compensate for wear. In operation, the rear friction ring 32 limits the movement of the shaft or spindle 20 in that direction. Likewise the ring 33 limits the movement of the spindle 20 in a forward direction. If the ring 33 adheres to the flange 31 it will be carried around with the latter in a clockwise direction and will turn the nut 40 to move the latter outwardly, thereby reducing the pressure applied through the alining rings 43 and 44. This movement of the nut 40 is opposed by the spring 51 and causes the latter to be elongated, thereby increasing the spring tension. Should the bearing between the ring 33 and the flange 31 become too loose, the spring 51 will turn the nut 40 to move the latter inwardly. Thus it will be evident that by properly adjusting the tension of the spring, the friction rings 32 and 33 will be clamped against the sides of the flange 31 with a substantially uniform pressure, and will prevent any material end play or movement of the spindle. The alining rings 43 and 44 insure a uniform application of pressure from the nut 40 to the ring 33. The device is self-adjusting, and automatically compensates for wear.

I claim as my invention:

1. A spindle fixture having, in combination, a sleeve, bearings in opposite ends of said sleeve, a spindle rotatably mounted in said bearings, and a unit mounted in said sleeve about said spindle and between said bearings, said unit bearing against said spindle to prevent endwise movement in both directions and being self-adjustable to compensate for variations from a predetermined pressure thereby against said spindle.

2. A spindle fixture having, in combination, a sleeve, bearings in opposite ends of said sleeve, a spindle rotatably mounted in said bearings, said spindle having a peripheral flange, a pair of bearing rings engaging opposite sides of said flange, and means for pressing said rings against said flange, said means being self-adjustable upon rotary movement of said rings with said flange to reduce said pressure or upon looseness between said flange and said rings to increase said pressure.

3. A spindle fixture having, in combination, a spindle having a peripheral flange, a pair of members frictionally engaging opposite sides of said flange, means for clamping said members against said flange, said means being connected for rotary movement with one of said members, and being adapted upon movement of said last mentioned member with said flange to reduce the pressure, and spring means resisting the movement of said means with said flange and tending to move said means in a direction to increase said pressure.

4. A spindle fixture having, in combination, a sleeve, a housing in said sleeve open at one end and having a radial flange on its other end, a spindle journaled in said sleeve and extending through said housing, said spindle having a peripheral enlargement, a ring mounted on said spindle between said flange and one side of said enlargement, a ring engaging the other side of said enlargement, a nut threaded into the open end of said housing, means connecting said last mentioned means and said nut for joint rotary movement, the direction of lead of the threads being such that upon rotation of said nut with said spindle said nut will be moved outwardly, self-alining means disposed between said last mentioned ring and said nut, and means tending to rotate said nut in a direction opposite to the direction of rotation of said spindle.

5. A spindle fixture having, in combination, a sleeve, a housing in said sleeve open at one end and having a radial flange on its other end, a spindle journaled in said sleeve and extending through said housing, said spindle having a peripheral enlargement, a ring mounted on said spindle between said flange and one side of said enlargement, a ring engaging the other side of said enlargement, a clamping nut threaded into the open end of said housing, and connected to said last mentioned ring for rotary movement therewith, the direction of lead of the threads being such that upon rotation of said nut with said spindle said nut will be moved outwardly to release said last mentioned ring from said enlargement, spring means tending to move said nut inwardly to clamp said last mentioned ring against said enlargement, and means for adjusting the tension of said spring means.

6. A spindle fixture having, in combination, a spindle, fixed means limiting the movement of said spindle endwise in one direction, and adjustable means bearing against said spindle to limit its endwise movement in the other direction, said last mentioned means being self-adjustable through frictional engagement with said spindle to reduce excessive friction and being self-adjustable to take up looseness.

7. A spindle fixture having, in combination, a rotary spindle having a peripheral enlargement, means fixed against endwise movement frictionally engaging one side of said enlargement, means frictionally engaging the other side of said enlargement, adjustable means for pressing said last mentioned means against said enlargement, said adjustable means being movable by said last mentioned means in a direction to decrease the pressure between said last mentioned means and said enlargement upon rotation by friction of said last mentioned means with said enlargement, and spring means tending to move said adjustable means in a direction to increase said pressure.

8. A spindle fixture having, in combination, a rotary spindle having a peripheral enlargement, means fixed against endwise movement and bearing against one side of said enlargement, means bearing against the other side of said enlargement, spring actuated means for pressing said last mentioned means against said enlargement, and a pair of coacting alining members interposed between said two last mentioned means and being capable of rocking about two mutually perpendicular axes, said members serving to transmit the pressure uniformly.

9. A spindle fixture having, in combination, a rotary spindle, a friction member engaging said spindle and serving to prevent endwise movement in one direction, a second friction member bearing against said spindle and serving to prevent endwise movement in the other direction, and spring actuated means serving to press said members against said spindle, said means being self adjustable through friction between said means and said spindle to reduce said friction when over a predetermined amount.

10. Means for limiting end play of a rotary element comprising two abutments between which said element is held against axial movement, one of said abutments being movable, and means governed by the degree of friction between said movable abutment and said rotary element for controlling the pressure of said movable abutment against said element.

11. Means for limiting end play of a rotary element comprising two abutments between which said element is held against axial movement, one of said abutments being movable, and self adjusting spring means governed by the degree of friction between said movable abutment and said rotary element for controlling the pressure of said movable abutments against said element.

12. A spindle fixture having, in combination, a spindle, means limiting the movement of said spindle in one direction, said spindle having an annular radial shoulder opposed to said means, a bearing member engaging said shoulder to hold said spindle against the first mentioned means, a clamping member adapted upon movement in one direction to press said bearing member against said shoulder, and upon movement in the other direction to relieve the pressure of said bearing member against said shoulder, means connecting said bearing member and said clamping member to transmit rotary movement of said bearing member with said shoulder to said clamping member in said last mentioned direction, and resilient means tending to move said clamping member in said first mentioned direction.

13. A spindle fixture having, in combination, a spindle having opposed annular radial shoulders, means fixed against movement longitudinally of said spindle and bearing against one of said shoulders, bearing means rotatable on said spindle and bearing against the other of said shoulders, a clamping member adapted upon rotary movement in one direction to press said bearing means against its shoulder, and upon rotary movement in the other direction to relieve the pressure between said bearing means and its shoulder, spring means tending to rotate said clamping member in said first mentioned direction, and means connecting said bearing means and said clamping member for joint rotary movement, said bearing means upon rotary movement through friction with its shoulder serving to move said clamping member in said last mentioned direction.

In testimony whereof, I have hereunto affixed my signature.

GERARD A. DE VLIEG.